UNITED STATES PATENT OFFICE.

RUDOLF SCHÜLE, OF FRANKFORT-ON-THE-MAIN, GERMANY, ASSIGNOR TO CASSELLA COLOR COMPANY, A CORPORATION OF NEW YORK.

FAST YELLOW DYES AND PROCESS OF MAKING SAME.

1,172,061. Specification of Letters Patent. Patented Feb. 15, 1916.

No Drawing. Application filed March 17, 1913. Serial No. 754,822.

*To all whom it may concern:*

Be it known that I, RUDOLF SCHÜLE, Ph.D., a subject of the Swiss Republic, and residing at Waldschmidtstrasse 26, Frankfort-on-the Main, Germany, have invented certain Fast Yellow Dyes and Process of Making Same, of which the following is a full description.

According to my invention a tetrazotized base of the diaminotriphenylmethane group is coupled with two molecules of a pyrazolonesulfonic acid and thereby yellow to orange wool dyestuffs are produced which are distinguished by their good solubility and their excellent fastness to light, and especially to milling. Analogous dyestuffs are obtained by employing disulfonic acids of the bases and unsulfonated pyrazolones. The two molecules referred to may be both the same or two different pyrazolones, and if sulfonic acids of the bases be employed one of the molecules may be unsulfonated pyrazolone and the other a sulfonic acid of a pyrazolone.

The symmetrical dyestuff obtained from one molecule of diaminotriphenylmethane and two molecules of o-chlor-p-sulfophenylmethylpyrazolone has the following constitution:

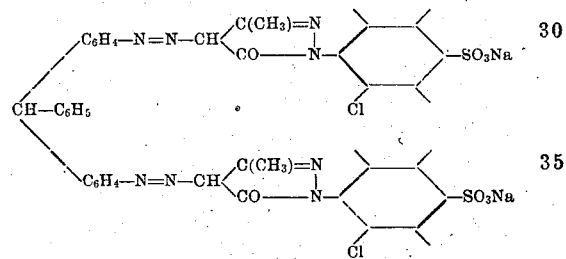

The symmetrical dyestuff obtained from one molecule of diamino-o-o-tolylphenylmethane, one molecule of (5)-sulfo-o-tolylmethylpyrazolone and one molecule of p-sulfophenylmethylpyrazolone is represented by the following graphical formula:

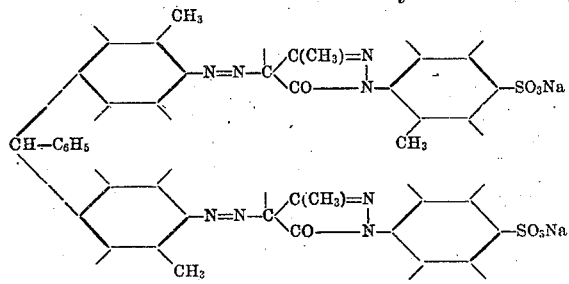

The process of manufacture is illustrated by the following examples:

Example I: A solution of 27.4 kilos diaminotriphenylmethane in about 300 liters water and 60 liters hydrochloric acid of 20° Bé. are well cooled; then a solution of 13.8 kilos sodium nitrite is slowly added. The diazo compound is stirred into a solution of 57.7 kilos o-chlor-p-sulfophenylmethylpyrazolone to which are added 44 kilos sodium carbonate in 500 liters water. In order to complete the reaction, the solution is gradually heated to about 35-40° C. and then allowed to stand for some hours. From the solution thus obtained the dyestuff is separated in the usual manner by salting out. The yellowish greenish solution of the dyestuff is not changed in shade by hydrochloric acid but it is rendered somewhat lighter by caustic soda. The coloring matter dissolves in concentrated sulfuric acid with a yellow color.

Example II: A solution of 34.3 kilos diamino-o-o-dichlortriphenylmethane (from benzaldehyde and o-chloranilin) in 500 liters water and 60 liters hydrochloric acid of 20° Bé. is tetrazotized at 0° C. with a solution of 13.8 kilos sodium nitrite. It is combined as before with 53.6 kilos (5) sulfo-o-tolylmethylpyrazolone in the presence of 44 kilos sodium carbonate dissolved in 500 liters water. The dyestuff is similar to the one described above, dyeing wool a clear greenish-yellow shade.

Example III: 37.6 kilos m-nitrophenyldiaminodixylylmethane (obtained from m-nitrobenzaldehyde and two molecules p-xylidin) are dissolved in a solution of 20 liters hydrochloric acid of 20° Bé. in 500 liters water, cooled with ice to 0° C., and charged with 40 liters more hydrochloric acid. A solution of 13.8 kilos sodium nitrite is added while the temperature is kept at 0° C. Then a cold solution of 57.7 kilos o-sulfo-p-chlorphenylmethylpyrazolone and 44 kilos sodium carbonate in 500 liters water is allowed to run into the tetrazo solution. The formation of the dyestuff is completed by raising the temperature of the solution slowly to 40° C. The dyestuff dyes wool a reddish-yellow shade.

Example IV: 36.2 kilos of the condensation product of benzaldehyde and aminocresolmethylether are dissolved in 600 liters water and 20 liters hydrochloric acid of 20° Bé., and tetrazotized at 0° C. with 13.8 kilos sodium nitrite. By combination with a solution of 50.8 kilos p-sulfophenylmethylpyrazolone and 44 kilos sodium carbonate in about 500 liters water cooled down to 0° C., a reddish orange dyestuff is obtained.

Example V: A dyestuff may be produced from two different pyrazolonesulfonic acids as follows: A solution of 30.2 kilos diamino-di-o-o-tolylphenylmethane in 200 liters water and 60 liters hydrochloric acid is tetrazotized in the usual manner with 13.8 kilos sodium nitrite. This solution is neutralized by the addition of a solution of 58 kilos sodium acetate. An intermediate compound is formed by allowing the solution of 26.8 kilos (5)-sulfo-o-tolylmethylpyrazolone to run slowly into the solution of the tetrazo compound, until an excess of the latter has disappeared. The intermediate compound thus obtained is allowed to run into a solution of 25.4 kilos p-sulfophenylmethylpyrazolone and 44 kilos sodium carbonate in 400 liters water, cooled down to 0° C. The dyestuff is separated by salting out.

Example VI: The tetrazo compound obtained in the usual manner from 37.6 kilos of the diaminotriphenylmethanemonosulfonic acid (formed from benzaldehyde monosulfonic acid and anilin) is combined in the presence of sodium acetate with 17.4 kilos phenylmethylpyrazolone, dissolved with caustic soda and water. The intermediate compound which is sparingly soluble in water is allowed to run into a solution of 29 kilos o-chlor-p-sulfophenylmethylpyrazolone rendered alkaline with sodium carbonate. The dyestuff dyes wool pure greenish yellow shades.

Example VII: 43.4 kilos of the disulfonic acid obtained by treating diaminotriphenylmethane with sulfuric acid of 66° Bé. at a low temperature, are tetrazotized in the usual manner. By combining this tetrazo compound with 34.8 kilos phenylmethylpyrazolone in the presence of sodium carbonate a yellowish orange dyestuff is obtained.

Having now particularly described and ascertained the nature of my said invention and in what manner the same is to be performed, I declare that what I claim is:

1. The process of producing fast dyestuffs by combining the tetrazo compound obtained by tetrazotizing a diaminotriarylmethane base with two molecules of an arylmethylpyrazolonesulfonic acid.

2. The process of producing fast azo dyes by combining the tetrazo compound obtained by tetrazotizing a diaminotriarylmethane base with two molecules of two different arylmethylpyrazolonesulfonic acids.

3. The process of producing fast azo dyes by combining the tetrazo compound obtained by tetrazotizing a diaminotriphenylmethanesulfonic acid with two molecules of an arylmethylpyrazolone.

4. The process of producing fast azo dyes by combining the tetrazo compound obtained by tetrazotizing a diaminotriarylmethanesulfonic acid with one molecule of an arylmethylpyrazolone and one molecule of an arylmethylpyrazolonesulfonic acid.

5. As new articles of manufacture the hereinbefore described new azo dyes derived from tetrazotized diaminotriarylmethane compounds and arylmethylpyrazolone compounds, these new azo dyes dyeing animal fibers in an acid bath greenish yellow to orange yellow shades of great fastness to milling and being in the dry state yellow to brown powders, dissolving readily in water with a yellow color, which is not altered by the addition of hydrochloric acid, and which is rendered somewhat paler by the addition of caustic soda, and which yield on being reduced a diaminotriarylmethane compound and an arylmethylaminopyrazolone.

6. The process of producing yellow disazo dyestuffs which consists in combining the tetrazo compounds of the diaminotriarylmethanes with two molecules of an arylmethylpyrazolonesulfonic acid.

7. The process of producing fast azo dyes by combining the tetrazo compound obtained by tetrazotizing a diaminotriphenylmethanesulfonic acid with two molecules of an arylmethylpyrazolone.

In witness whereof I have hereunto signed my name this 4th day of March 1913, in the presence of two subscribing witnesses.

Dr. RUDOLF SCHÜLE.

Witnesses:
  JEAN GRUND,
  CARL GRUND.